(12) United States Patent
De Oto

(10) Patent No.: US 7,675,487 B2
(45) Date of Patent: *Mar. 9, 2010

(54) SIMPLIFIED LIGHT-EMITTING DIODE (LED) HYSTERETIC CURRENT CONTROLLER

(75) Inventor: Leonard De Oto, Springfield, OH (US)

(73) Assignee: Honeywell International, Inc., Morristown, NJ (US)

(*) Notice: Subject to any disclaimer, the term of this patent is extended or adjusted under 35 U.S.C. 154(b) by 1203 days.

This patent is subject to a terminal disclaimer.

(21) Appl. No.: 11/181,815

(22) Filed: Jul. 15, 2005

(65) Prior Publication Data

US 2007/0013323 A1 Jan. 18, 2007

(51) Int. Cl.
G09G 3/30 (2006.01)

(52) U.S. Cl. .............................. 345/76; 345/82; 345/84

(58) Field of Classification Search ............. 345/44–53, 345/76–85, 204–215; 315/224, 247, 291–311
See application file for complete search history.

(56) References Cited

U.S. PATENT DOCUMENTS

| 4,071,884 | A | 1/1978 | Maigret |
| 4,504,776 | A | 3/1985 | Haville |
| 5,381,077 | A | 1/1995 | McGuire |
| 6,150,771 | A | 11/2000 | Perry |
| 6,153,985 | A * | 11/2000 | Grossman ................... 315/291 |
| 6,313,670 | B1 | 11/2001 | Song et al. |
| 6,448,550 | B1 | 9/2002 | Nishimura |
| 6,489,724 | B1 | 12/2002 | Smith et al. |
| 6,611,110 | B1 | 8/2003 | Fregoso |
| 6,628,252 | B2 | 9/2003 | Hoshino et al. |
| 6,680,834 | B2 | 1/2004 | Williams |
| 6,740,079 | B1 * | 5/2004 | Eggers et al. ................. 606/34 |
| 6,798,152 | B2 | 9/2004 | Rooke et al. |
| 6,836,157 | B2 | 12/2004 | Rader et al. |
| 6,841,947 | B2 | 1/2005 | Berg-johansen |
| 6,844,760 | B2 | 1/2005 | Koharagi et al. |

(Continued)

FOREIGN PATENT DOCUMENTS

EP 0 342 814 A2 11/1989

(Continued)

OTHER PUBLICATIONS

"Application Note MLX 10801 High Voltage Solutions," Melexis: Microelectronic Integrated Systems, 8 Pages, Sep. 29, 2004.

(Continued)

Primary Examiner—Vijay Shankar
(74) Attorney, Agent, or Firm—Black Lowe & Graham PLLC; P. G. Scott Born

(57) ABSTRACT

An LED current control device (100) includes an array of one or more LEDs (10) electrically connected to a current-sensing element (20). A sense signal produced by the current-sensing element may be amplified by a single-ended amplifier (30) and sent to a switching controller (40 and 50). The switching controller may perform hysteretic control on the amplified sense signal by controlling a switching element (60) to turn on and off. The on and off states of the switching element respectively enables and disables an external power supply ($V_{EXT}$) for the LED array. As such, hysteretic control may be performed on the current flowing through the LEDs.

19 Claims, 7 Drawing Sheets

U.S. PATENT DOCUMENTS

| | | |
|---|---|---|
| 6,870,325 B2 | 3/2005 | Bushell et al. |
| 6,923,804 B2 * | 8/2005 | Eggers et al. .................. 606/34 |
| 7,071,762 B2 * | 7/2006 | Xu et al. ..................... 327/423 |
| 7,511,436 B2 * | 3/2009 | Xu .............................. 315/307 |
| 2002/0060526 A1 | 5/2002 | Timmermans et al. |
| 2002/0140380 A1 * | 10/2002 | Biebl ......................... 315/291 |
| 2002/0158590 A1 | 10/2002 | Saito et al. |
| 2003/0025465 A1 | 2/2003 | Swanson et al. |
| 2003/0085749 A1 * | 5/2003 | Xu et al. ..................... 327/423 |
| 2003/0209997 A1 | 11/2003 | St. Germain et al. |
| 2004/0030328 A1 * | 2/2004 | Eggers et al. ................. 606/34 |
| 2004/0239704 A1 | 12/2004 | Soar |
| 2004/0257120 A1 | 12/2004 | Wang et al. |
| 2005/0029527 A1 | 2/2005 | Yamamoto et al. |
| 2005/0073489 A1 | 4/2005 | Suzunaga et al. |
| 2006/0267514 A1 * | 11/2006 | Xu .............................. 315/291 |

FOREIGN PATENT DOCUMENTS

| | | |
|---|---|---|
| JP | 2001-277583 A | 10/2001 |
| WO | WO-2004/057921 A1 | 7/2004 |
| WO | WO-2004/100614 A1 | 11/2004 |

OTHER PUBLICATIONS

"IC Specification MLX 10801 Power LED driver for automotive applications, Power saving low side soil driver, Electronic Fuse," Melexis: Microelectronic Integrated Systems, 35 Pages, May 14, 2004.

LMV7235/LMV7239 45ns, Ultra Low Power, Low Voltage, Rail-to-Rail Input Comparator with Open-Drain/Push-Pull Output; National Semiconductor, pp. 1-12; Feb. 2002.

* cited by examiner

SIMPLIFIED LIGHT-EMITTING DIODE (LED) HYSTERETIC CURRENT CONTROLLER

CROSS-REFERENCE TO RELATED APPLICATIONS

The present is related to co-pending U.S. patent application Ser. No. 11/069,298 entitled "LIGHT-EMITTING DIODE (LED) HYSTERETIC CURRENT CONTROLLER", filed on Mar. 1, 2005, the entire contents of which are hereby incorporated by reference.

FIELD OF THE INVENTION

The present invention is directed to regulating current in light-emitting diodes (LEDs) and, more particularly, to sensing and performing hysteretic control on the current in the LEDs using a simplified, current-sense amplifier.

BACKGROUND OF THE INVENTION

Currently, there exist systems for regulating the current in high powered light-emitting diodes (LEDs) that utilize a transistor to switch on and off the powering of the LEDs by an external voltage source. Such systems utilize a sensing resistor that can be used to monitor the current while the transistor is switched on. When the sensed current reaches a certain threshold, the powering of the LEDs from the external source is switched off for a predetermined period of time during which the current is not sensed. After this predetermined period, the transistor is turned back on. This process of on and off switching is repeated throughout the operation of the LEDs.

However, such systems for regulating LED current do not allow the sensing resistor to provide a very accurate measure of the average current. Also, in these systems, the time period between switching off and switching back on the LED power is determined based on a user-determined switching frequency—not the sensed current. As such, these systems cannot precisely control an average or root-mean-square (RMS) current flowing through the LEDs.

SUMMARY OF THE INVENTION

Exemplary embodiments of the present invention provide a device and method for performing hysteretic control of the current flowing through an array of one or more light-emitting diodes (LEDs) connected in series.

According to an exemplary embodiment, the device performs on and off switching of a power supply for the LED array in order to perform hysteretic control on the current flowing through the array. A switching controller may be implemented in the current control device to control the on and off switching of a transistor (e.g., MOSFET switch) disposed between the power supply and the LED array.

In order to use hysteresis to control the current flowing through the LEDs, the LEDs may be connected to a current-sensing element that produces a signal indicative of the current in the LEDs during both the "on" and "off" switching states.

In an exemplary embodiment, the current-sensing element is designed to dissipate only a small amount of power to ensure efficient, but accurate, measurement of the current flowing through the LED array. Accordingly, the signal produced by the current-sensing element ("sense signal") may be amplified to a suitable level before being sent to the switching controller.

The current-sensing element may be a resistor ("sense resistor") whose ohmic value is designed so that the voltage across the resistor is small and little power is dissipated. One end of the sense resistor may be connected to the LED array, while the other end is electrically grounded. The voltage at the end of the sense resistor connected to the LED array may be used as the sense signal indicating the amount of current in the array. This "sense voltage" may be input to a single-ended amplifier to generate an amplified sense voltage to be sent to the switching controller. Thus, hysteretic control may be performed on the amplified sense voltage in order to switch the power supply on and off for the LED array.

According to an exemplary embodiment, the switching controller may include a window comparator designed to compare the amplified sense voltage to a "window" comprised of upper and lower voltage thresholds ("trip levels"). Hysteretic control may be implemented by switching off the external power to the LEDs when the amplified sense signal reaches the upper trip level, and switching on the external power when the amplified sense signal decreases to the lower trip level.

The LED array may also be connected to an energy storage element, which stores excess energy while switching is in the "on" state. Thus, while in the "on" state, the current flowing through the array will increase gradually, or "ramp up". During the "off" switching state, this excess energy may be dissipated in the LEDs, such that the current decreases gradually or "ramps down". In an exemplary embodiment, this storage element is an inductor.

Further aspects in the scope of applicability of the present invention will become apparent from the detailed description provided hereinafter. However, it should be understood that the detailed description and the specific embodiments therein, while disclosing exemplary embodiments of the invention, are provided for purposes of illustration only.

BRIEF DESCRIPTION OF THE DRAWINGS

A more complete understanding of the present invention will become apparent from the following description taken in conjunction with the accompanying drawings, wherein.

DETAILED DESCRIPTION OF EXEMPLARY EMBODIMENTS

The present invention is directed to a device and method for controlling the current flowing through an array of one or more light-emitting diodes (LEDs) connected in series.

Figure 1:
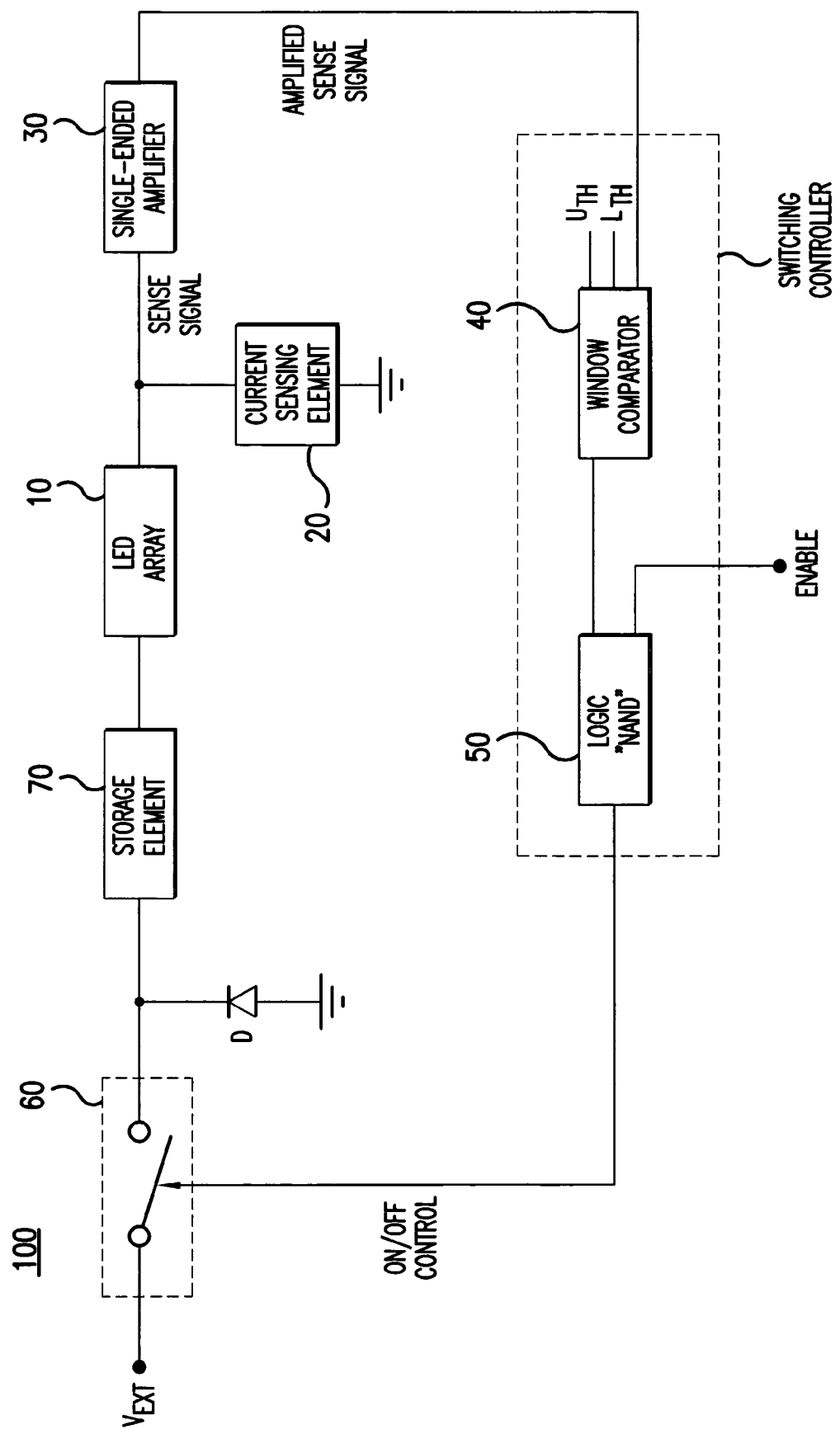
FIG. 1 illustrates a circuit diagram for a current control device, according to an exemplary embodiment of the present invention.

FIG. 1 is a block diagram representation of a device 100 for controlling LED current using hysteresis, according to an exemplary embodiment. This device 100 is also referred herein as an "LED current control device". FIG. 1 shows a power supply $V_{EXT}$ and an LED array 10 comprising one or more LEDs connected in series. FIG. 1 also shows a switching element 60 and an energy storage element 70 ("storage element") disposed between the power supply $V_{EXT}$ and the LED array 10.

Figure 2:
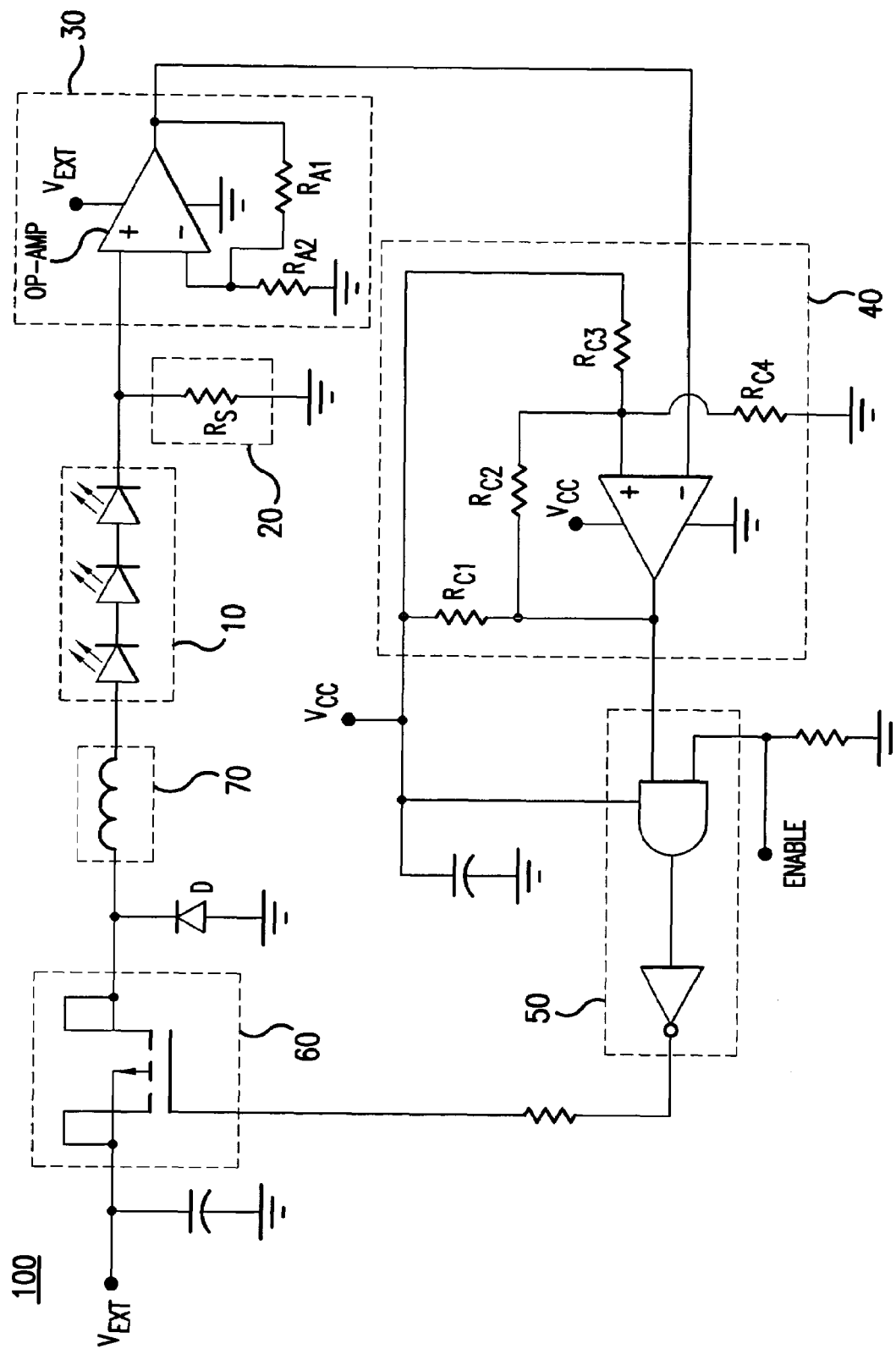
FIG. 2 illustrates a particular implementation of the current control device illustrated in FIG. 1, according to an exemplary embodiment of the present invention.

As shown in FIG. 2, the LED array 10 may be configured such that the anode of the first LED ("the anode end") of the LED array 10 is connected to the storage element 70. The cathode of the last LED ("the cathode end") of the LED array 10 is connected to one end of a current-sensing element 20, the other end of the current-sensing element 20 being electrically grounded.

In an exemplary embodiment, the LED array 10 includes three (3) LEDs (as shown in FIG. 2). However, the number of LEDs may be reduced to two (2) or one (1). Alternatively, the LED array may contain more than three (3) LEDs. According to exemplary embodiments, the LEDs may be white, red, or of another color.

According to the embodiment illustrated in FIGS. 1 and 2, it is contemplated that the LED array 10 may contain up to four (4) white LEDs connected in series, or up to eight (8) red LEDs.

Referring to FIG. 1, the current-sensing element 20 is configured to produce a signal, which is indicative of the current flowing through each LED in the LED array 10. As shown in FIG. 1, this signal ("sense signal") is output to a single-ended amplifier 30.

According to an exemplary embodiment, as shown in FIG. 2, the current-sensing element may be comprised of a resistor $R_S$ ("sense resistor") having one end electrically grounded, and the other end electrically connected to both the anode end of the LED array 10 and the input of the single-ended amplifier 30. The voltage, in reference to ground, at the point of the sense resistor $R_S$ connected to the single-ended amplifier 30 may be used as the sense signal. Accordingly, the single-ended amplifier 30 amplifies the voltage between this connection point and ground to produce an "amplified sense signal".

As illustrated in FIGS. 1 and 2, the storage element 70 is disposed between a terminal of the switch element 60 and the cathode end of the LED array 10. In an exemplary embodiment, the storage element 70 may be comprised of an inductor L, as shown in FIG. 2.

FIG. 1 further illustrates a diode D whose anode is commonly connected to a terminal of the switching element 60 and the storage element 70, while the cathode is electrically grounded.

As mentioned above, the sense signal produced by the current-sensing element 20 is sent to a single-ended amplifier 30 ("sense signal amplifier"). The output of the sense signal amplifier 30, i.e., the amplified sense signal, is sent to a window comparator 40. According to an exemplary embodiment, the sense signal amplifier 30 may be comprised of an operational amplifier, as illustrated in FIG. 2.

FIG. 1 further illustrates a window comparator 40 and a logic "NAND"device 50, which are collectively referred to as a "switching controller". The window comparator receives the amplified sense signal from the sense signal amplifier 30, and compares the received signal to an upper and lower voltage thresholds ("upper and lower trip levels") $U_{TH}$ and $L_{TH}$, respectively. In FIG. 1, an input of the logic NAND device 50 is connected to the window comparator 40 in order to receive the result of the comparison operation performed on the amplified sense signal. Another input of the logic NAND device 50 is connected to receive an externally applied ENABLE signal. Both the output of the window comparator 40 and the ENABLE signal may be digital signals having either a logical "High" or "Low" level. The logic NAND device 50 is configured to perform a logical "NAND" operation on the output signal of the window comparative 40 and the ENABLE signal. The output of the logic NAND device 50 is connected to the switching element 60 in such a manner as to control "on" and "off" switching of the switching element 60.

Referring to FIG. 1, the switching element 60 is connected to the output of the logic "NAND" device 50, as described above. The switching element 60 also includes a terminal connected to the power supply $V_{EXT}$, and another terminal connected to the storage element 70 (and the cathode of diode D).

According to an exemplary embodiment, the switching element 60 is a transistor configured so that its "on" state electrically connects the power supply $V_{EXT}$ to the LED array 10 (via the storage element 70). As such, the "on" state of switching element 60 provides an electrical path for current to flow from the power supply $V_{EXT}$ and through the storage element 70, LED array 10, and current sensing element 20 to ground. During the "on" state, diode D is reversed bias by the voltage applied at the anode.

In this embodiment, the transistor's 60 "off" state allows the current from the storage element 70 to forward bias the diode D. Thus, an electrical path is created for the current from the storage element 70 to flow through the LED array 10 and current sensing element 20 to ground, and from ground through the diode D back to the storage element 70.

Principles of operation of exemplary embodiments of the LED current control device 100 will be described below, in connection with FIGS. 1 and 2. In particular, FIG. 2 is provided to illustrate a specific exemplary embodiment of the LED current control device 100 illustrated in FIG. 1. It should be noted that FIG. 2 is provided for purposes of illustration only and is not meant to limit the present invention to any particular exemplary embodiment illustrated therein or described herein below.

According to an exemplary embodiment, the power supply $V_{EXT}$ may be set to supply a voltage of substantially 15 volts (V). In such an embodiment, the LED array 10 may comprise up to three (3) LEDs connected in series, as shown in FIG. 2. In situations where less than three (3) LEDs are implemented in the LED set 10, the frequency of the on and off switching and, thus, the frequency of the current flowing through the LED set 10 will increase.

As such, it may be necessary to adapt certain component values in the LED current control device 100 in situations where either one (1) or two (2) LEDs are implemented in the LED array 10, in comparison to an embodiment utilizing three (3) LEDs. For instance, where the storage element 70 is comprised of an inductor, it may be necessary to increase the inductance value to accommodate the increased frequency that occurs when less than three (3) LEDs are used. It may also be necessary to adjust the trip levels of the window comparator 40, e.g., by adjusting one or more of the resistor values $R_{C1}$-$R_{C4}$ in the embodiment of FIG. 2.

According to another exemplary embodiment, more than three (3) LEDs may be included in the LED set 10. Specifically, it is contemplated that up to four (4) white LEDs may be utilized in the LED array 10. It is also contemplated that the LED array 10 may contain up to eight (8) red LEDs. However, the embodiment illustrated by FIG. 2 illustrates the use of a MOSFET switch 60 to drive the LED array 10. In such an embodiment, the power supply is substantially limited to an upper value of 18 V. According to such an embodiment, the LED current control device 100 would not likely support more than four (4) white LEDs, or eight (8) red LEDs, within the LED array 10.

Although white and red LEDs are discussed above, the LED array 10 may include LEDs of other colors, or non-visible LEDs (e.g., infra-red or ultra-violet LEDs). For different embodiments using different colored or non-visible LEDs, it may necessary to adapt the component settings (e.g., inductor values) and configuration (e.g., number of LEDs) based on the different characteristics of different colored LEDs.

It will be readily apparent to those of ordinary skill in the art how to adapt component values in, and determine the structural limitations of, the LED current control device 100 based on the factors discussed above (e.g., based on the number and color of LEDs in the LED array 10).

The current-sensing element 20 is used for "sensing" the current flowing through the LED array 10. Specifically, the current-sensing element 20 produces a sense signal that indicates the amount of current flowing through the LED array 10 to the current-sensing element 20.

According to an exemplary embodiment, the current sensing element 20 is an impedance-based component (e.g., resistor), and the sense signal is the voltage generated by the current flowing through the impedance of the current-sensing element 20. In such an embodiment, the generated voltage is substantially proportional to the current in the LED array 10.

For instance, in the exemplary embodiment illustrated in FIG. 2, the current-sensing element 20 is a small resistor $R_S$ ("sense resistor"), and the voltage ("sense voltage") generated by the sense resistor $R_S$ is the sense signal. The sense resistor $R_S$ may be designed to have a small resistance, thereby resulting in low power consumption (and a small sense voltage). For example, the sense resistor $R_S$ may have a resistance substantially within the range of 0.10-1.0 Ohms. As such, the sense voltage produced by the sense resistor $R_S$ accurately reflects the current in each of the LEDs of the LED array 10.

While describing the LED current control device 100, the reference numeral "20" will be used when generally referring to a current sensing element in this written description, while the reference symbol "$R_S$" will be used when specifically referring to a sense resistor.

The sense signal produced by the current-sensing element 20 is amplified by the sense signal amplifier 30. For instance, in the exemplary embodiment illustrated in FIG. 2, the single-ended, sense signal amplifier 30 may be implemented using an operational amplifier circuit, which is connected to receive and amplify the sense voltage. The use of a single-ended type of amplifier, such as the illustrated operational amplifier circuit 30 in FIG. 2, is advantageous because it is less expensive and complex than circuits using differential type amplifiers (e.g., instrumentation amplifiers).

According to exemplary embodiments utilizing an operational amplifier (e.g., in FIG. 2), resistors $R_{A1}$ and $R_{A2}$ are used for setting the gain of the sense signal amplifier 30. As illustrated in FIG. 2, the operational amplifier may be configured as a simple non-inverting amplifier, whose gain may be set according to the following equation:

$$\text{Gain}=(R_{A1}+R_{A2})/R_{A2} \quad (\text{EQ. 1})$$

According to an exemplary embodiment, the gain of the sense signal amplifier 30 may be set to substantially 21 by using resistance values of $R_{A1}$=20.0 k Ohms and $R_{A2}$=1.0 k Ohms. However, in alternative exemplary embodiments, the gain of the sense signal amplifier 30 may be increased or decreased, as necessary.

Although the exemplary embodiment in FIG. 2 illustrates the implementation of a non-inverting, operational amplifier circuit, such implementation is not limiting as to the present invention. Those of ordinary skill in the art will recognize that other types of single-ended amplifier circuits may be used without departing from the spirit or scope of the present invention. Such other types of amplifier circuits may be configured with an adjustable gain, similar to that described above.

According to an exemplary embodiment, the sense signal amplifier 30 is designed to amplify the sense voltage of the sense resistor $R_S$ according to an approximate scale of 1 V=100 milliAmperes (mAmp). To implement such a scale, where the gain of the sense signal amplifier 30 is set approximately to 20 (i.e., set to 21 by using $R_{A1}$=20.0 k Ohms and $R_{A2}$=1.0 k Ohms), the resistance of the sense resistor $R_S$ may be set to $R_S$=0.499 Ohms.

As illustrated in FIGS. 1 and 2, the amplified sense signal is sent to the switching controller. As illustrated in FIG. 1, the switching controller includes the window comparator 40 and the logic NAND device 50. In exemplary embodiments, the switching controller performs hysteretic control on the amplified sense signal (and, thus, performs hysteretic control on the current flowing through the LED array 10) in order to control the on and off switching of the switching element 60 (in a manner described in more detail below).

According to the exemplary embodiment illustrated in FIG. 2, the amplified sense signal (i.e., amplified sense voltage) is received by the window comparator 40. The window comparator 40 is designed to compare the received amplified sense voltage to the upper and lower voltage thresholds (upper and lower trip levels) $U_{TH}$ and $L_{TH}$. According to an exemplary embodiment, the window comparator 40 is configured as an inverting comparator with hysteresis. In other words, when the received amplified sense voltage is greater than the upper trip level $U_{TH}$, the output of the window comparator 40 transitions to a Low logic level; when the amplified sense voltage is less than the lower trip level $L_{TH}$, the output of the window comparator 40 transitions into a High logic level.

According to an exemplary embodiment, as illustrated in FIG. 2, the window comparator 40 may be implemented using a 7235-type comparator IC. In such an embodiment, resistors may be used to set the upper and lower trip $U_{TH}$ and $L_{TH}$. In the particular embodiment illustrated in FIG. 2 resistors $R_{C1}$, $R_{C2}$, $R_{C3}$, and $R_{C4}$ are used to set the upper and lower trip levels $U_{TH}$ and $L_{TH}$.

For example, consider the case where hysteretic control is to be performed by the switching controller to maintain the current in the LED array 10 between 400 mAmp and 100 mAmp. Using the scale of 1 V=100 mAmp to produce the amplified sense voltage (as described above), the upper and lower trip levels $U_{TH}$ and $L_{TH}$ may be set at 4 V and 1 V, respectively.

According to the above example, the window comparator 40 may be configured as follows. The supply voltage $V_{CC}$ of the 7235 comparator (e.g., in FIG. 2) may be set to 5 V. To set the upper and lower trip levels $U_{TH}$ and $L_{TH}$, the following resistance values may be used: $R_{C1}$=2.0 k Ohms, $R_{C2}$=1.0 k Ohms, $R_{C3}$=3.48 k Ohms, and $R_{C4}$=6.49 k Ohms. Other circuit configurations would be similar to those illustrated in FIG. 2.

In order to implement another current-to-voltage scale for the amplified sense voltage, or an alternative hysteresis range for the current in the LED set 10, it will be apparent to those of ordinary skill in the art how to determine the appropriate values of $R_{C1}$, $R_{C2}$, $R_{C3}$, and $R_{C4}$. For instance, the upper and lower trip levels $U_{TH}$ and $L_{TH}$ may be set in such a manner as to set a particular root-mean-square (RMS) current or average current to flow through the LED array 10.

Figure 5A:
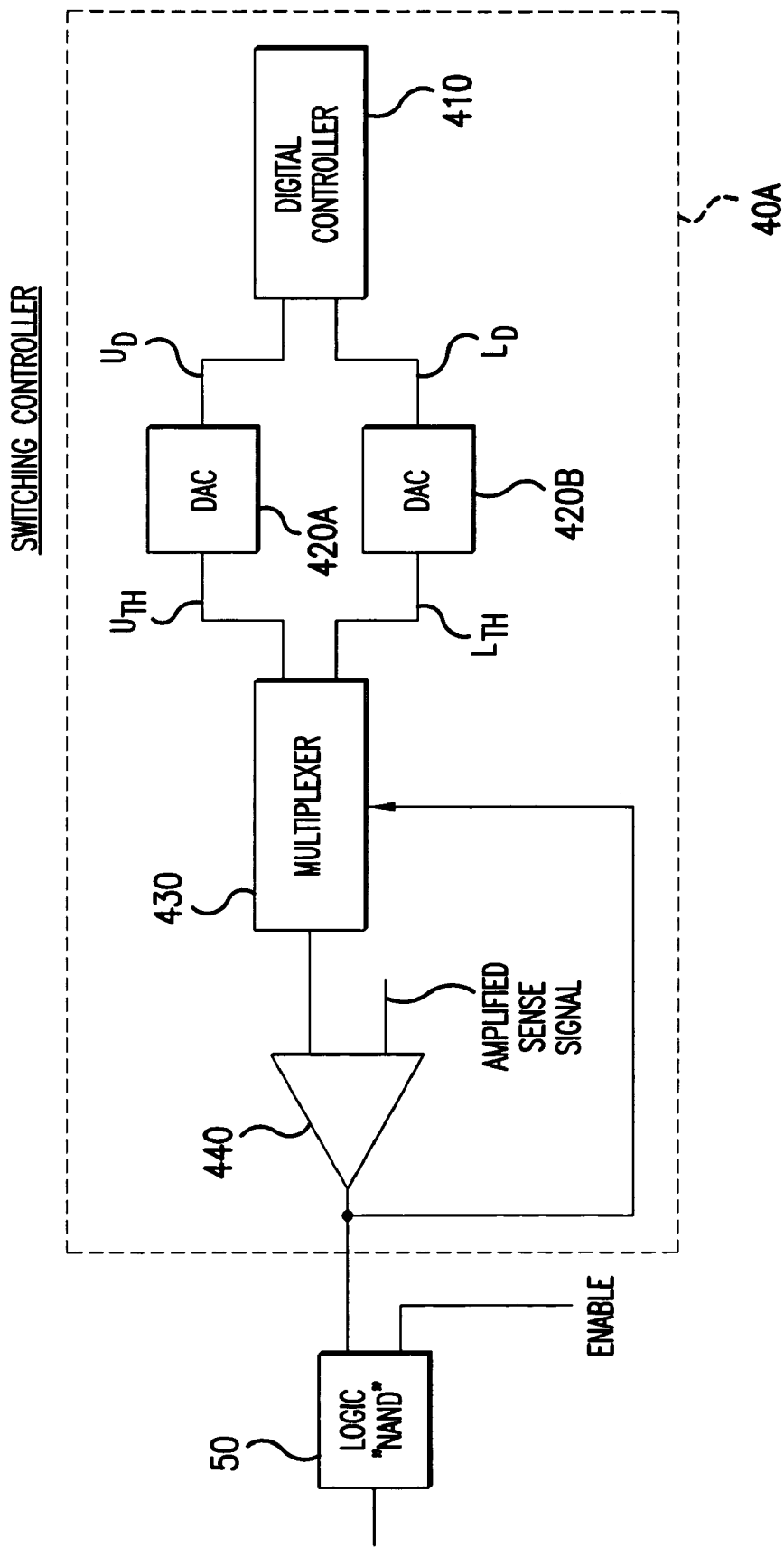
FIGS. 5A and 5B are circuit diagrams illustrating alternative exemplary embodiments of the present invention.
Figure 5B:
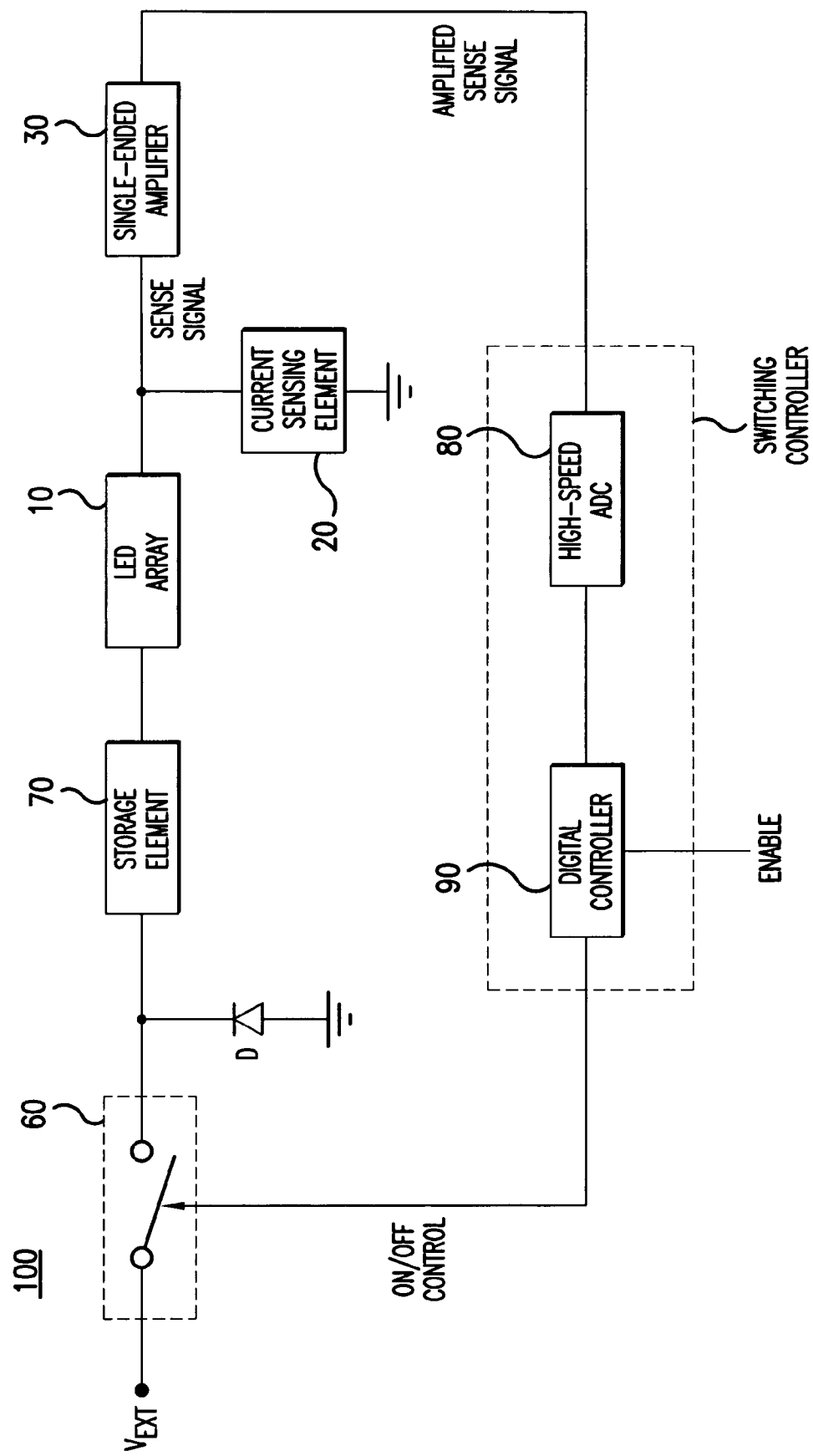

Although the embodiment in FIG. 2 illustrates the implementation of a 7235 type of comparator, such implementation is not limiting as to the present invention. Those of ordinary skill in the art will recognize that other types of comparator circuits or ICs may be used in the window comparator 40 without departing from the spirit and scope of the present invention. Also, those of ordinary skill in the art will recognize that the window comparator 40 utilize different general circuit configurations (e.g., as illustrated in FIG. 5B below).

Referring to the switching controller in FIGS. 1 and 2, the logic NAND device 50 is implemented to provide external control of the LED array 10 through the use of an externally applied ENABLE signal. For instance, when the ENABLE signal is in the Low logic state, the switching element 70 will be turned off regardless of the signal output from the window comparator 40.

According to the exemplary embodiment illustrated in FIG. 2, the logic NAND device 50 may be implemented using a logical AND gate whose output is connected to an inverting driver. However, this configuration is merely provided for illustration, and other configurations (e.g., using a dual input inverting driver) may be used.

The use of the logic NAND device 50 may allow the ENABLE signal to be used to perform pulse width modulation (PWM) dimming. For instance, PWM dimming may be performed externally by, e.g., switching the ENABLE between High and Low logic levels in such a manner as will be readily apparent to those of ordinary skill in the art. Also, the external ENABLE signal can be used simply as an "On/Off" switch for the LED array 10.

The output of the logical NAND device 50 is used for turning on and off the switching element 60. According to an exemplary embodiment, a MOSFET switch may be used as the switching element 60, as illustrated in FIG. 2. In such an embodiment, the gate of the MOSFET switch 70 may be connected to receive the output of the switching controller. The drain of the MOSFET switch 60 may be connected to receive the power supply $V_{EXT}$, while the source of the MOSFET switch 60 is commonly connected to the cathode of diode D and the storage element 70 (e.g., inductor L).

The following will describe the operation of the LED current control device 100 as the switching element 60 is switched from the off to on state, according to an exemplary embodiment.

The switching element 60 will be switched to the on state when two conditions are satisfied: (1) the amplified sense signal is below the lower trip level $L_{TH}$ in the window comparator 40, and (2) the ENABLE is set to High level. As such, the switching element 60 will reverse bias the diode D, thereby shutting the diode D off. The power supply $V_{EXT}$ powers up each of the LEDs in the LED array 10. Accordingly, current flows through the electrical path from $V_{EXT}$ through the storage element 70, the LED set 10, and the current-sensing element 20 (e.g., sense resistor $R_S$ to ground (and back to the power supply $V_{EXT}$).

As current flows in such a manner, the storage element 70 stores excess energy, thus causing the flowing current to increase linearly or "ramp up". Accordingly, the current flowing through the LED array 10 ramps up while the switching element 60 is turned on. According to an exemplary embodiment, the storage element 60 is an inductor L, as illustrated in FIG. 2.

Next, the operation of the LED current control device 100 will be described as the switching element 60 is switched from on to off, according to an exemplary embodiment.

The switching element 60 will switch off when either the amplified sense signal rises above the upper trip lever $U_{TH}$ in the window comparator 40, or the ENABLE signal transitions to the Low level.

Consider the situation where the switching element 60 is switched from on to off in response to the amplified sense signal rising above the upper trip level $U_{TH}$. The power supply $V_{EXT}$ is blocked by the switching element 60 and, thus, disabled from powering the LED array 10. In turn, the diode D becomes forward biased.

As this occurs, current continues to flow through the LED array 10. The excess energy stored in the storage element 70 while the switching element 60 was turned on is now dissipated through the LED array 10 and current-sensing element 20 to ground. From ground, the current flows through the forward biased diode D back to the storage element 70. The current flowing through the LED array 10 and current-sensing element 20 decreases linearly or "ramps down" until the amplified sense signal reaches the lower trip level $L_{TH}$. The switching element 60 is turned back on after the amplified sense signal reaches trip level $L_{TH}$ (unless the ENABLE signal is at Low level).

Particularly, in the exemplary embodiment of FIG. 2, the switching off of MOSFET switch 60 causes the inductor L to switch polarity and force current through the LED array 10 and sense resistor $R_S$ to ramp down until the amplified sense voltage output from the operational amplifier reaches the lower trip level $L_{TH}$ and the MOSFET switch 60 is turned on (assuming that ENABLE is High).

The switching controller continues switching its output between High and Low logic levels, thereby causing the LED current control device 100 to switch between modes of operation in which the current in the LED array 10 ramps up (on state) and ramps down (off state). Thus, hysteretic control is performed by the switching controller on the current flowing through the one or more LEDs in the LED array 10.

According to the specific exemplary embodiment illustrated in FIG. 2, the inductor L may be implemented with an inductance value that ensures that the switching frequency does not become so high that the single-ended amplifier 30 is unable to maintain an accurate representation of the current through the LED array 10. To ensure that the frequency is maintained at an appropriate level, the inductance of inductor L may be adapted based on variations in the number and type of LEDs in the LED array 10, or the voltage level of the power supply $V_{EXT}$. It would be readily apparent to those of ordinary skill in the art how to set the inductance value of the inductor L based on such factors.

As shown in FIG. 2, the LED current device 100 may include various other components (e.g., capacitors and resistors) to ensure stable operation of the LED current control device 100. However, FIG. 2 is provided for proposes of illustration only and is not meant to be limiting on the present invention. Specific implementations, as well as variations, on the elements and circuit configurations illustrated in FIGS. 1 and 2 are within the scope of the present invention, as will be readily contemplated by those of ordinary skill in the art.

For example, it would be readily apparent to those of ordinary skill in the art that the LED current control device 100 may be modified to allow for dynamic adjustment of the trip levels $U_{TH}$ and $L_{TH}$ in the window comparator 40. Such modifications may include the implementation of one or more rheostats in the resistor network ($R_{C1}$, $R_{C2}$, $R_{C3}$, and $R_{C4}$) of the window comparator 40 illustrated in FIG. 2.

According to other exemplary embodiments, the LED current control device 100 may be modified to provide dynamic adjustment of the trip levels $U_{TH}$ and $L_{TH}$. FIGS. 5A and 5B illustrate alternative embodiments to provide such dynamic adjustment.

FIG. 5A illustrates an alternative exemplary embodiment of a window comparator 40A in the LED current control device 100. Specifically, the window comparator 40A includes a digital controller 410 that outputs digital values $U_D$ and $L_D$ corresponding to the upper and lower trip levels $U_{TH}$ and $L_{TH}$, respectively. For example, digital controller 410 may include a microprocessor-based device that allows a user to input and adjust the average/RMS value of the current to flow through the LED array 10. Based on the input value, the digital controller 410 may be configured to calculate the necessary values for $U_D$ and $L_D$.

Referring to FIG. 5A, the digital controller 410 outputs the digital values $U_D$ and $L_D$ to digital-to-analog converters (DACS) 420A and 420B, respectively. DACs 420A and 420B convert the respective values $U_D$ and $L_D$ into the upper and lower trip levels $U_{TH}$ and $L_{TH}$, respectively. The upper and lower trip levels are sent to the multiplexer 430. Based on the current state of hysteretic control (i.e., whether the amplified sense signal is ramping up or down), the multiplexer 430 may be programmed to select the relevant trip voltage $U_{TH}$ or $L_{TH}$ to be applied to comparator 440. Specifically, the output of the comparator 440 may be used as a control signal to select whether $U_{TH}$ or $L_{TH}$ should be output.

In FIG. 5A, comparator 440 may be implemented using any type of comparator IC or device, as will be contemplated by those of ordinary skill in the art. The comparator 440 compares the amplified sense signal from the sense signal amplifier 30 to the trip level ($U_{TH}$ or $L_{TH}$) output from the multiplexer 430.

The comparator 440 may be configured as an inverting comparator with hysteresis. As the amplified sense signal is ramping down, the amplified sense signal is compared to the lower trip level $L_{TH}$. The output of the comparator 440 will be Low level until the amplified sense signal reaches the lower threshold, at which point the comparator 440 will output a High level. The High output of the comparator causes the multiplexer 430 to output the upper trip level $U_{TH}$ to the comparator 440. Accordingly, the increasing amplified sense signal is compared to $U_{TH}$, and the comparator's 440 output remains High until $U_{TH}$ is reached. When the amplified sense signal reaches $U_{TH}$, the comparator 440 outputs a Low signal. This causes the multiplexer to output the lower trip level $L_{TH}$ to the comparator 440 for comparison with the decreasing amplified sense signal, etc.

Referring to FIG. 5A, the output of the comparator 440 is sent to the logic NAND device 50, and the rest of the circuit 100 operates as described above in relation to FIG. 1.

FIG. 5B illustrates another exemplary embodiment in which the trip levels $U_{TH}$ and $L_{TH}$ are dynamically adjusted. Specifically, FIG. 5B illustrates an alternative embodiment in which the configuration of the switching controller in the LED current control device 100 differs from that illustrated in FIG. 1.

Specifically, the switching controller of FIG. 5B includes a high-speed analog-to-digital converter (ADC) 80 for receiving the amplified sense signal. The output of the high-speed ADC 80 is connected to a digital controller 90. The digital controller's 90 output is connected to the switching element 60. The digital controller 90 may comprise, e.g., a microprocessor-based device for receiving a user's input regarding the desired average/RMS current.

In FIGS. 1 and 5B, similar elements are given like reference numerals and operate according to the same principles described above in connection with FIG. 1.

In the embodiment of FIG. 5B, the digital controller 90 performs the function of both the window comparator 40 and logic NAND device 50 of FIG. 1. The digital controller 90 may be capable of adjusting the upper and lower trip levels $U_{TH}$ and $L_{TH}$ based on a user's input (e.g., average or RMS current level for the LED array 10). In an exemplary embodiment, the digital controller 90 contains internal registers for storing $U_{TH}$ and $L_{TH}$, respectively.

In FIG. 5B, the digital controller 90 may be configured to continuously compare the output of the high-speed ADC 80 to the trip levels $U_{TH}$ and $L_{TH}$ in order to perform hysteretic control of the amplified sense signal. The digital controller 90 may further be configured to output a signal that turns the switching element 60 on or off depending on the comparison result (and the state of the ENABLE signal).

Figure 3A:
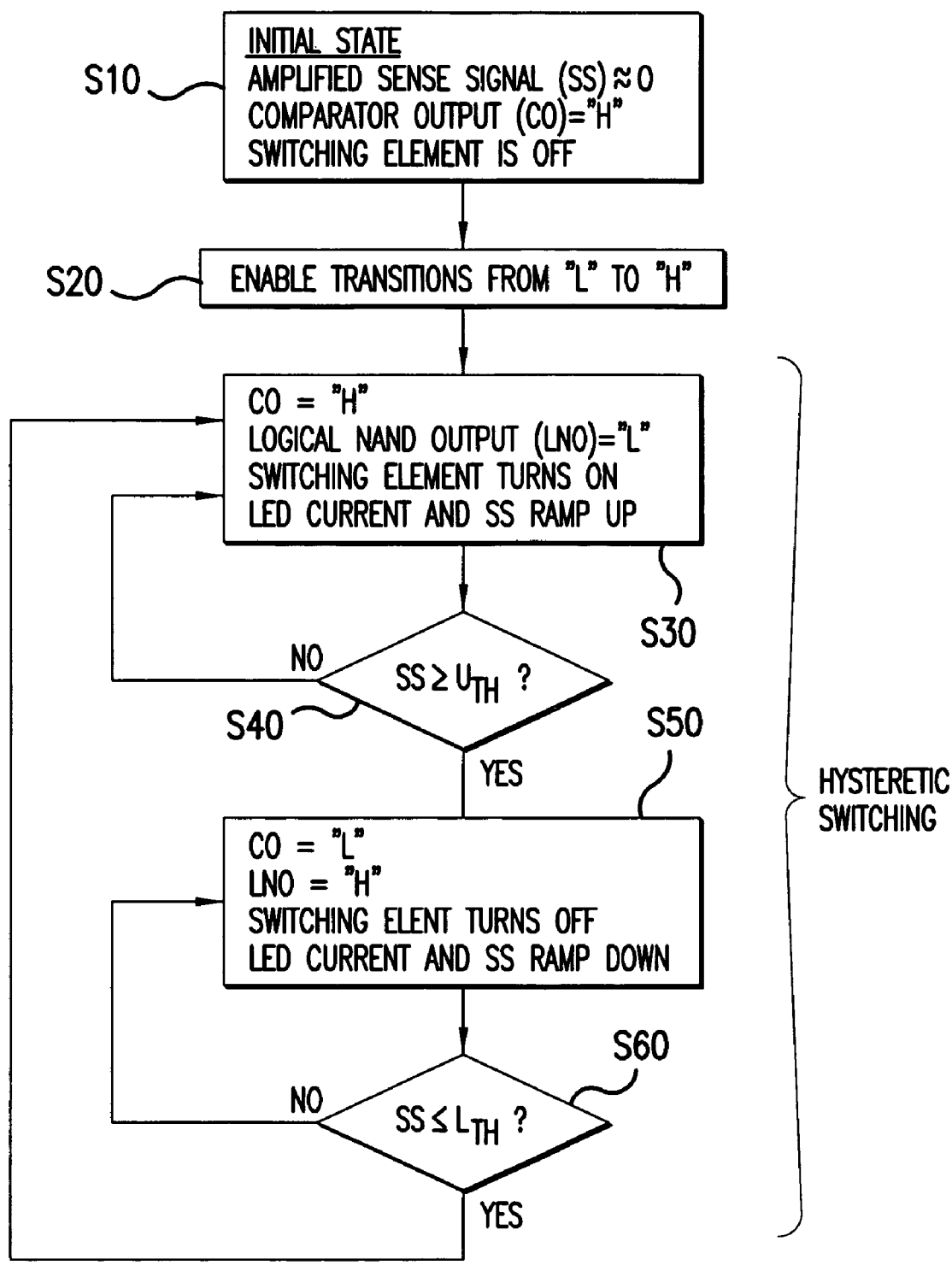
FIGS. 3A and 3B are flowcharts illustrating the process of the current control device, according to an exemplary embodiment of the present invention.
Figure 3B:
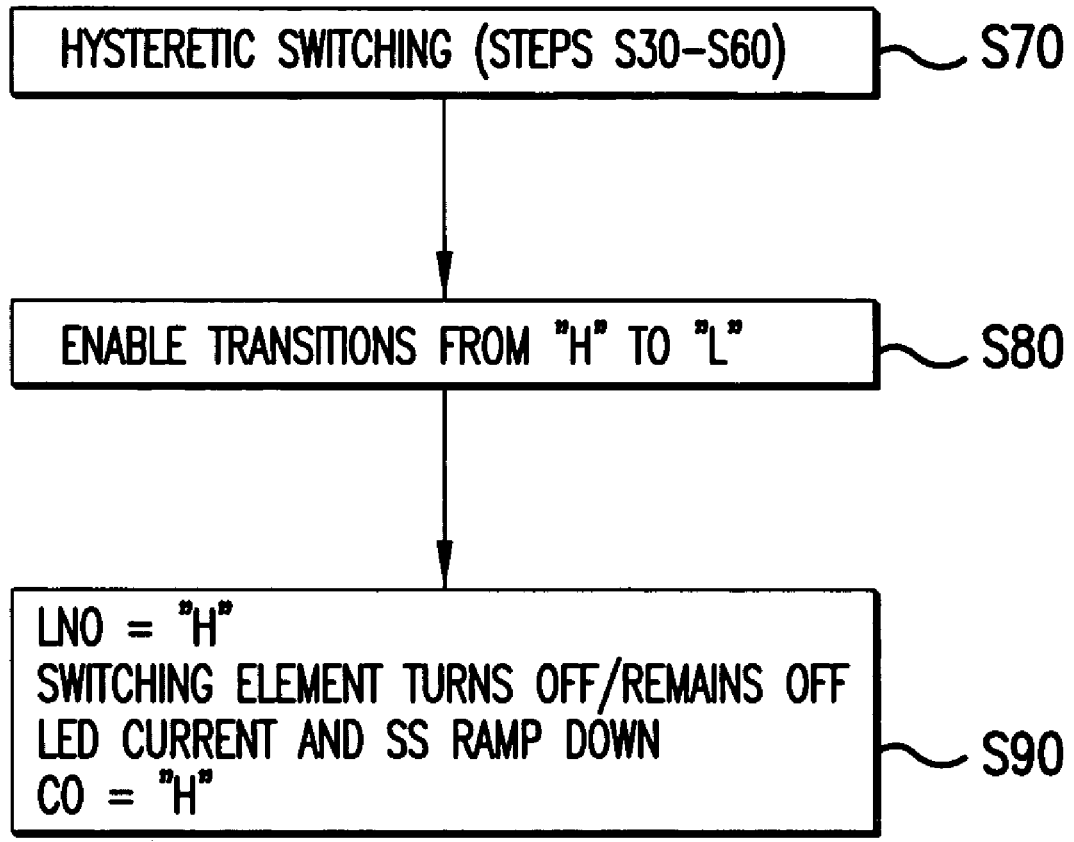
Figure 4:
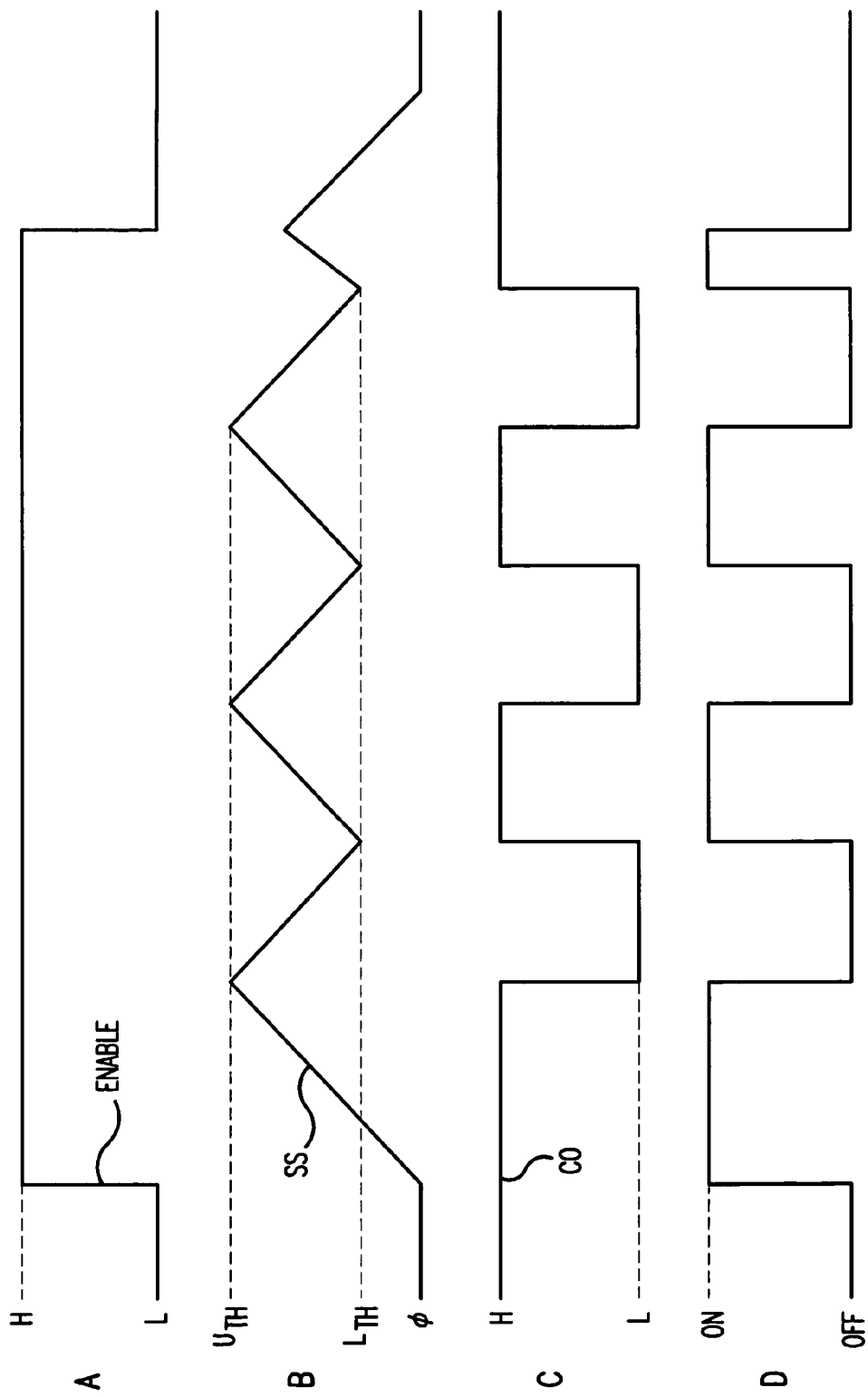
FIG. 4 is a set of timing diagrams illustrating the process of the current control device, according to an exemplary embodiment of the present invention.

Next, the operation of the LED current control device 100 according to exemplary embodiments will be described in connection with FIGS. 3A, 3B, and 4. FIG. 3A is a flowchart describing the operation of controlling LED current when the ENABLE signal transitions from Low to High logic level, according to the exemplary embodiment. FIG. 3B is a flowchart describing the operation when the ENABLE signal transitions from High to Low logic level, according to an exemplary embodiment. FIG. 4 illustrates a timing diagram illustrating the operation of various elements and signals in relation to the ENABLE signal.

Referring to FIG. 4, diagram A illustrates the ENABLE signal as a function of time. Diagram B of FIG. 4 illustrates the amplified sense signal ("SS"), which is substantially proportional to the current flowing through the LED array 10, as a function of time. In FIG. 4, diagram C illustrates the logic level of the output of the window comparator 40 ("CO"), as a function of time. Diagram D of FIG. 4 illustrates the state (on or off of the switching element 60, as a function of time.

Referring to FIG. 3A, the initial values of the amplified sense signal SS and the output CO of the window comparator 40, as well as the initial state of the switching element 70, as indicated in block S10. Particularly, the amplified sense signal is substantially equal to zero, due to the fact that the ENABLE signal is initially at a Low level, and the power supply $V_{EXT}$ is disabled from powering the LED array 10. As also illustrated in S10, the output CO of the window comparator 40 is initially at a HIGH level because the amplified sense signal is below the lower trip level $L_{TH}$. Even though the output CO of the window comparator 40 is High, the switching element 60 is in the off state because the ENABLE signal is at the Low level. This initial state is illustrated at the left-most portion of diagrams A-D in FIG. 4.

In FIG. 3A, block S20 illustrates the step in which the ENABLE signal transitions from Low to High level. As shown in block S30, the output of the logic NAND device 50 ("LNO") becomes a Low-level signal due to the transition of the ENABLE signal. As such, the switching element 60 turns on, as shown in S30. This causes the current in the LED array 10 and the amplified sense signal SS to ramp up, as shown in S30. FIG. 4 illustrates the change in the state of the switching element 60 and the ramping up of the amplified sense signal SS in response to the transition of the ENABLE signal from Low to High.

As illustrated in FIG. 3A, block S30 represents one of the two operation modes between which the LED current control device 100 switches while hysteretic switching is being performed by the switching controller. The LED current control device 100 will remain in this mode until the amplified sense signal reaches the upper trip level $U_{TH}$, at which time the LED current control device 100 switches to the other mode of operation. This switching is illustrated by decisional block S40 and block S50 of FIG. 3A. When the upper trip level $U_{TH}$ is reached by the amplified sense signal SS, the output CO of the window comparator 40 becomes Low, thereby causing the logical NAND device 50 to output a High signal, as shown in S50. Thus, the switching element 60 turns off, and the current in the LED array 10 and the amplified sense signal SS ramp down, as shown in S50.

Referring to FIG. 3A, the LED current control device 100 remains in the operational mode represented by block S50 until the amplified sense signal SS decreases to the lower trip level $L_{TH}$, as illustrated by decisional block S60. Once the lower trip level is reached, the hysteretic control of the switching controller causes the switching element 60 to turn on, according to S30, thereby causing the current in the LED array 10 to again ramp up.

As illustrated in FIG. 4, the LED current control device 100 alternates between the operational modes in which the current in the LED array 10 and the amplified sense signal SS ramps up (switching element 60 is on), and the current in the LED array 10 and the amplified sense signal ramps down (switching element 60 is off). This alternating between modes (i.e., hysteretic control) continues until the ENABLE signal transitions from High to Low level, as shown in FIG. 4. As shown in diagram B in FIG. 4, the amplified sense signal SS (and, thus, the current level in the LED array 10) approximates a sawtooth ramping function.

FIG. 3B is a flowchart illustrating the operation of the LED current control device 100 in response to the ENABLE signal changing from High to Low level. Specifically, block S70 shows that the hysteretic switching continues (according to S30-S60 in FIG. 3A) while the ENABLE signal is at the High level. In block S80, the ENABLE signal transitions from High to Low level.

As a result of the ENABLE signal transition, the following will occur, as illustrated by block S90 in FIG. 3B. The output LNO of the logical NAND device 50 will either change to Low level (if currently at the High level), or remain at the Low level (if currently at the Low level). Thus, the switching element 60 will either turn off (if currently in the on state) or remain off (if currently in the off state). Accordingly, the current in the LED array 10 and the amplified sense signal SS with either start or continue to ramp down.

In FIG. 3B, block S90 also shows what happens to the output CO of the window comparator 40. If the window comparator's 40 output CO is currently Low when the ENABLE signal changes to Low, the output CO will transition to High as the amplified sense signal SS reaches the lower trip level $L_{TH}$. If the output CO of the window comparator 40 is already at the High level when ENABLE becomes Low, the output CO will remain at High.

The right-most portion of diagrams A-D in FIG. 4 illustrate the situation described above in connection with block S90 of FIG. 3B.

Exemplary embodiments of the present invention provide several advantages over existing systems. For example, an exemplary embodiment allows for the current flowing through each LED to be sensed while the power supply $V_{EXT}$ for the LEDs is both turned on and off. This allows the current to be regulated using hysteresis. As such, the current in each LED may be accurately set to a particular RMS or average level. Also, accurate PWM control may be implemented using an external signal (ENABLE).

It should also be noted that exemplary embodiments of the present invention (e.g., as illustrated in FIG. 2) are fault tolerant, in the sense that a short occurring in one of the LEDs in the LED array 10 does not prevent other LEDs from continuing to operate.

Exemplary embodiments being thus described, it should be noted that any variations thereof may be made without departing from the spirit and scope of the present invention.

What is claimed is:

1. An apparatus for controlling current in an array of one or more light-emitting diodes (LEDs), comprising:
   a switching element disposed between a power supply and the LED array;
   a current-sensing element that produces a signal indicative of the current in the one or more LEDs;
   a switching controller that controls the switching element to switch the power supply on and off with respect to the LED array, based on the signal, to hysteretically control the current flowing through the LED array; and
   a single-ended amplifier configured to receive and amplify the signal, the amplified signal being sent to the switching controller, wherein the switching controller performs hysteretic control on the amplified signal.

2. The apparatus of claim 1, wherein the LED array includes three LEDs connected in series.

3. The apparatus of claim 2, wherein a short in one of the one or more LEDs does not prevent operation of the remaining ones of the one or more LEDs according to the hysteretic control.

4. The apparatus of claim 1, wherein the switching element is a MOSFET switch.

5. The apparatus of claim 1, further comprising: a storage element configured to store excess energy when the switching element is turned on, the stored energy being dissipated to the LED array when the switching element is turned off, such that the current flowing through the LED array approximates a ramping function that linearly increases and decreases.

6. The apparatus of claim 5, wherein the storage element is an inductor disposed between the switching element and an anode end of the LED array.

7. The apparatus of claim 1, wherein the single-ended amplifier comprises an operational amplifier.

8. The apparatus of claim 1, wherein the current-sensing element is a resistor having a first end electrically connected to a cathode end of the LED array, and a second end that is electrically grounded, the signal being the voltage at the first end of the resistor in reference to ground, wherein the single-ended amplifier receives the voltage at the first end of the resistor as input.

9. The apparatus of claim 1, wherein the switching controller constantly monitors the amplified signal to establish both switch-on and switch-off points for the power supply.

10. The apparatus of claim 9, wherein the switching controller includes a window comparator with two trip levels, and the switch-on and switch-off points are established based on the relationship of the amplified signal to the trip levels.

11. The apparatus of claim 10, wherein the switching controller switches the switching element on and off to perform hysteretic control on the voltage at the first end of the resistor.

12. The apparatus of claim 10, wherein the switching controller receives an enable signal, the switching controller being configured to perform at least one of on/off control and dimming control of the LED array based on the enable signal.

13. A method for controlling current in an array of one or more light-emitting diodes (LEDs), comprising:
   utilizing a switching element disposed between a power supply and the LED array to switch the power supply on and off with respect to the LED array;
   sensing current flowing through the LED array regardless of whether the externally supplied voltage source is switched on or off, and controlling the on and off switching of the power supply based on an amplified signal indicating the sensed current in order to perform hysteretic control on the sensed current.

14. The method of claim 13, wherein the switching element is disposed between the power supply and an anode end of the LED array, a cathode end of the LED array is electrically connected to a first end of a resistor, the resistor having a second end that is electrically grounded, and the method further comprises utilizing a single-ended amplifier to sense and amplify the voltage at the first end of the resistor in order to sense the current flowing through the LED array.

15. The method of claim 14, wherein the switching element is a MOSFET switch, and the controlling the on and off switching includes: comparing a signal indicative of the amplified signal with two trip voltages; and turning the MOSFET switch on and off based on the comparing.

16. The method of claim 14, further comprising: storing excess energy when the power supply is switched on; and dissipating the stored energy to the LED array when the power supply is switched off, wherein the current flowing through the LED array approximates a ramping function that linearly increases and decreases.

17. The method of claim 16 wherein the storing excess energy is performed by a storage element disposed between the switching element and a cathode end of the LED array.

18. The method of claim 17, wherein the storage element is an inductor.

19. The method of claim 14, wherein the controlling the on and off switching includes: constantly monitoring the amplified voltage to establish both switch-on and switch-off points for the power supply.

* * * * *